United States Patent [19]

Gibbons et al.

[11] 4,097,332

[45] Jun. 27, 1978

[54] HOLDDOWN STRUCTURE FOR A NUCLEAR REACTOR CORE

[75] Inventors: John Francis Gibbons; Daniel John McLaughlin, both of Windsor, Conn.

[73] Assignee: Combustion Engineering, Inc., Windsor, Conn.

[21] Appl. No.: 749,860

[22] Filed: Dec. 13, 1976

[51] Int. Cl.² ............................................. G21C 13/02
[52] U.S. Cl. ........................................ 176/87; 176/50
[58] Field of Search ............................. 176/50, 61, 87

[56] References Cited

U.S. PATENT DOCUMENTS

| 2,982,713 | 5/1961 | Sankovick et al. ............... 176/61 |
| 3,070,527 | 12/1962 | Hurford et al. ................. 176/61 |
| 3,920,514 | 11/1975 | Calvin ........................... 176/50 |

*Primary Examiner*—Harvey E. Behrend
*Attorney, Agent, or Firm*—Arthur L. Wade

[57] ABSTRACT

The core support barrel of a nuclear reactor is clamped and loaded from the closure head of the vessel with a holddown barrel extending as a link from the closure head to a seat on the core support barrel.

6 Claims, 2 Drawing Figures

HOLDDOWN STRUCTURE FOR A NUCLEAR REACTOR CORE

BACKGROUND OF THE INVENTION

1. Field of the Invention

The invention relates to an arrangement of core support structure which will transmit load on the reactor vessel closure head to the core support barrel. More specifically, the invention relates to forming, sizing and positioning a cylinder between the closure head and the core support barrel as an elastic clamp which can be readily modified to meet specific holddown requirements.

2. Description of the Prior Art

The heart of a nuclear reactor is its core. The core is a compact assembly of nuclear fuel rods, or pins, over which a liquid coolant is passed to be heated.

The hydraulic forces of the liquid coolant are large. During normal operation of the reactor, these forces are directed to displace the internal structure within the reactor vessel, including the core itself. In addition to displacement danger, vibration from these forces can threaten structural wear and even failure.

In the prior art, the core support barrel was hung from an internal flange of the reactor vessel. A ring structure has been placed between the upper guide structure flange and the closure head of the reactor vessel to transfer holddown force from the head to the barrel.

This ring-type holddown device has been only marginally capable of providing the required holddown forces. Also, there is the economic factor. The cost of these rings has ranged from $30,000 to $80,000.

More specifically, the ring-type holddown for the core support barrel is inherently limited in loading capability. The overall concept has little adjustment possible in the holddown force applied to the barrel.

SUMMARY OF THE INVENTION

A principal object of the invention is to provide the necessary mechanical link between the closure head and core support barrel with an overall spring constant which can be readily modified to meet specific holddown force magnitudes.

Another object is to form, size and arrange the reactor internal structure to provide the high clamping and holddown load on the core support barrel without the ring-type structure of the prior art.

Another object is to provide holddown loads for the core support barrel with an arrangement which will enable the core support barrel to be formed in more than one piece.

The invention contemplates a reactor vessel with an internal ledge from which the core support barrel of the reactor depends by its upper flange. A cylinder extends from the closure head of the reactor down to a seat on the core support barrel, functioning as a compression member in transmitting the clamping load on the head to the barrel. With the core support barrel in tension between the vessel ledge and the seat, and the cylinder in compression between the closure head and the seat, a high-strength elastic spring structure is formed which is loaded to the desired holddown load by an interference fit between the ledge gap at the vessel-closure head interface and the internal spring structure.

The invention further contemplates the support barrel shortened a significant distance below the internal ledge of the reactor vessel and its upper flange clamped between the lower end of the cylinder as a compression member and lower ledge of an intermediate supporting cylinder which does depend from the internal ledge of the reactor vessel by an upper external flange.

Other objects, advantages and features of this invention will become apparent to one skilled in the art upon consideration of the written specifications, appended claims and accompanying drawings.

DRAWING DESCRIPTION

FIG. 1 is a sectional elevation of a nuclear reactor vessel in which the present invention is embodied; and FIG. 2 is similar to FIG. 1 and discloses a modification of the holddown structure in which the invention is embodied.

DESCRIPTION OF THE PREFERRED EMBODIMENT

THE REACTOR: VESSEL AND CORE

Figure 1:
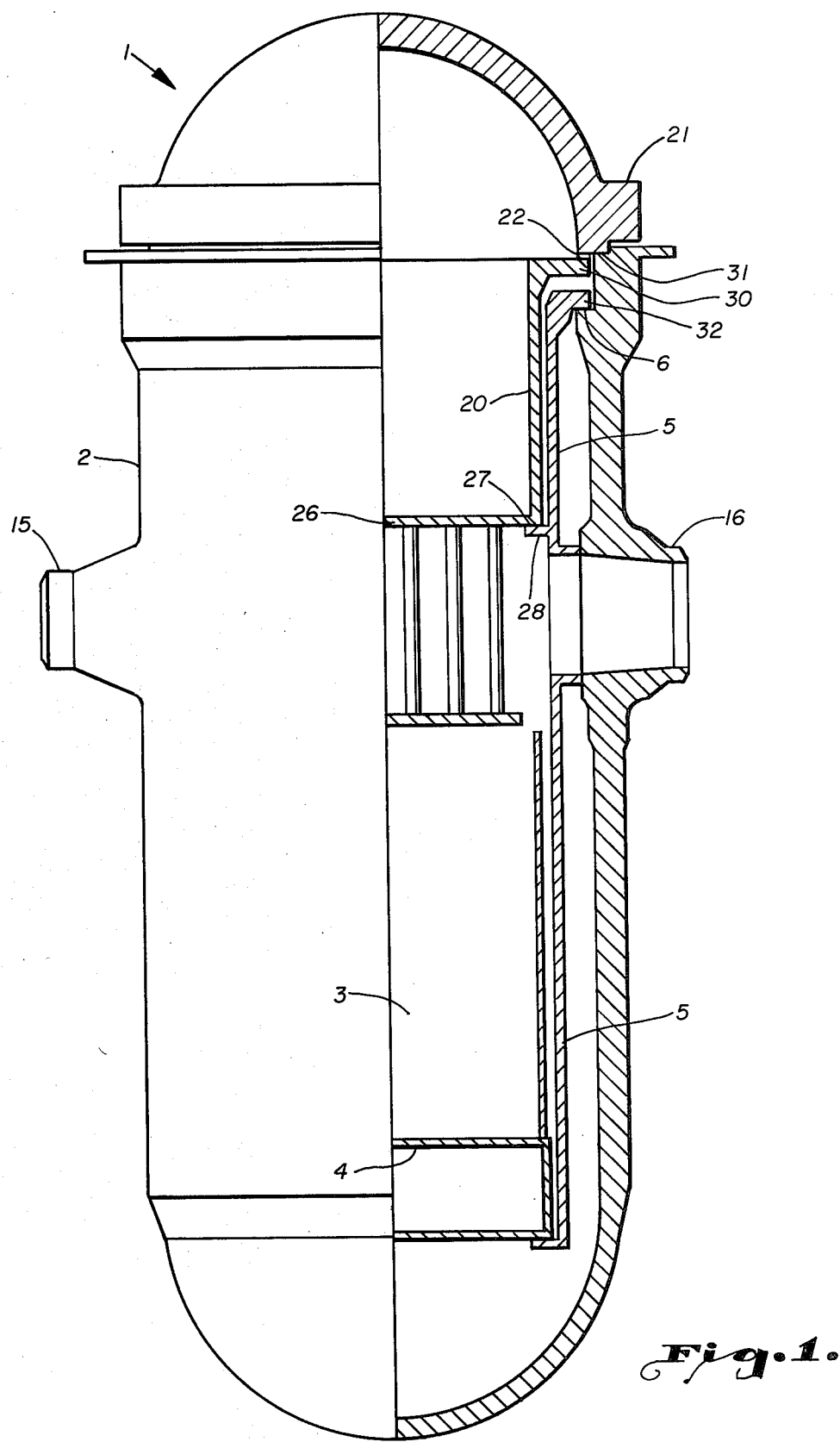

Referring now to FIG. 1 there is shown a nuclear reactor 1. The reactor vessel 2 has a core or fuel region 3.

Fuel region 3 is comprised of, and defined by, a plurality of nuclear fuel elements. These fuel rods, or pins, are arranged in assemblies, which need not be disclosed in any detail. Only their general location is significant. Each assembly includes vertical, hollow guide tubes which are fixed to upper and end plates and which give rigid support to the assembly. The assemblies are then supported in position by lower plate 4 which has apertures there-through for admitting coolant to the assemblies as the core 3.

Surrounding the core 3 and mounted to the lower support plate 4 is the core shroud. The lower support plate 4, and the entire core of fuel assemblies, is supported within the vessel 2 by the core support barrel 5 which hangs from internal ledge 6 formed on the upper end of vessel 2.

UPPER GUIDE STRUCTURE

The insertion and withdrawal of control elements comprised of a neutron poison is of vital importance to the operation of a nuclear reactor core. The guidance structure through which these control elements are inserted and withdrawn is provided by what has been termed upper guide structure (UGS). The UGS is spaced above the core and supported independently of the core of assemblies. A form of UGS, core and core barrel supports is disclosed in U.S. Pat. No. 3,849,251 issued Nov. 19, 1974.

In the prior art, the UGS has been hung from the equivalent of ledge 6 and disposed within core support barrel 5. More specifically, the UGS is given the form of a cylindrical barrel on, and within, which is centered the guidance structure for the control elements in the core below.

As will be systemmatically disclosed, the embodiment of the invention will provide the equivalent of the UGS. From another view, the UGS of the prior art may be looked upon as modified by the invention so as to achieve additional objects of the invention.

OVERALL REACTOR OPERATION

In operation, a liquid coolant, such as water, enters inlet nozzle 15 of reactor 1 and flows downwardly around the outside of the core support barrel 5. The coolant then flows inwardly and upwardly through apertures in the lower plate 4 and over the fuel rod assemblies which heat the coolant. The heated coolant then flows to outer nozzle 16, reaching the nozzle through apertures provided in plates above the core assemblies and in the wall of core support barrel 5.

As important to the overall reactor operation as the control rods and their mechanisms may be, the present disclosure assigns space without detail to this structure. The invention is embodied in the form and arrangement of the core support barrel 5, holddown barrel 20, ledge 6, closure head 21 and shim 22. This structure centers the embodiment of the invention and only those parts of the reactor have been associated with this structure which make the concept of the invention clear to one skilled in the art.

CORE SUPPORT

The flow of coolant through core 3 has been generally described. However, the magnitude of the hydraulic forces exerted on the core structure by the coolant must be recognized. The amount of coolant routed through the core 3 assemblies is high. For a reactor rated at 3800 Mwt, the quantity of the coolant is in the order of $164(10^6)$ pounds per hour. The force exerted by the coolant has been great enough to threaten displacement of the core support barrel which is supporting the core within the reactor vessel. If displacement is not achieved, certainly vibration is possible and this vibration can cause wear of the support barrel which could lead to failure. Obviously, all forces tending to displace the core support barrel must be successfully opposed.

The core support barrel 5 is hung from the internal ledge 6 at the top of the reactor vessel 1. Therefore, a force must be developed on the barrel flange to keep it firmly seated on the internal ledge 6. The present invention is embodied in the system which forms an effective mechanical link between the core support barrel 5 and the closure head 21 of the vessel. This link must be elastic and yet provide the required force. The link must have means to make an adjustment of the required force to accommodate specific design requirements. The link, desirably, should utilize the structure already in place within the vessel. All of these requirements, and more, are met with the present invention.

FIG. 1 discloses the core support barrel 5 as extending the major length of the reactor vessel. Specifically, the barrel extends from ledge 6 to below core 3, the core structure supported by a lower ledge formed on the barrel.

THE UGS AS A HOLDDOWN LINK

The UGS design of U.S. Pat. No. 3,849,257 may be a feature of the reactor in which the invention is embodied. From one viewpoint, this UGS barrel may be regarded as shown at 20. With a support plate 26 mounted on its lower end, the basic framework of an UGS is formed. From a second viewpoint, this barrel 20 is brought down on seat surface 27 of core support barrel 5. Barrel 20 may, from this viewpoint, be accurately termed a holddown barrel. This barrel 20 is disclosed as extending between the upper closure head 21 and seat 27 which is on lower internal flange 28 of the core support barrel 5. In this position the holddown force placed upon head 21 is transmitted to barrel 5 to resist the coolant forces directed to displace, or vibrate, barrel 5.

The drawing of FIG. 1 discloses the UGS barrel 20 as extending down, from the closure 21, a specific length of core support barrel 5 to seat on surface 27, of the barrel 5. The invention contemplates this compression-tension elastic link extending whatever distance specific design requirements demand. Wherever the specific couple is formed between the two barrels, the invention is embodied. In FIG. 1 internal flange 28 is disclosed on barrel 5 above the outlet nozzle 16. Flange 28 could provide surface 27 at an elevation below the outlet nozzle 16 and embody the invention.

BARREL 5 - BARREL 20 LINK

Barrel 20 is a compression member in function, bearing upon seat 27 of flange 28. More specifically, barrel 20 has an external flange 30 extending outwardly, beneath downwardly facing surface 31 of closure head 21. Between closure surface 31 and seat 27 the cylindrical wall of barrel 20 extends as a compression member.

It follows that when barrel 20 applies a compression load on barrel 5, barrel 5 is placed in tension. External flange 32 is extended outwardly at the top of barrel 5 to overhang and engage ledge 6. By this engagement, barrel 5 hangs from ledge 6. The upper part of the wall of barrel 5 is placed in tension between the flange 32 engagement of ledge 6 and the seat 27 of flange 28. The result is a high-strength elastic spring structure formed of the barrel walls down to seat 27 — flange 28.

The loading of the spring structure is designed by extending the length of barrel 20 enough to provide an interference fit between the ledge gap at the closure head interface and the internal spring structure. The dimensions of this structure can be readily varied to establish the overall spring constant to meet specific holddown requirements.

Flat shim ring 22 is placed between closure surface 31 and flange 30. This shim is machined to a thickness which will provide the precise interference fit for the desired spring constant.

TWO-PIECE CORE SUPPORT BARREL

Figure 2:
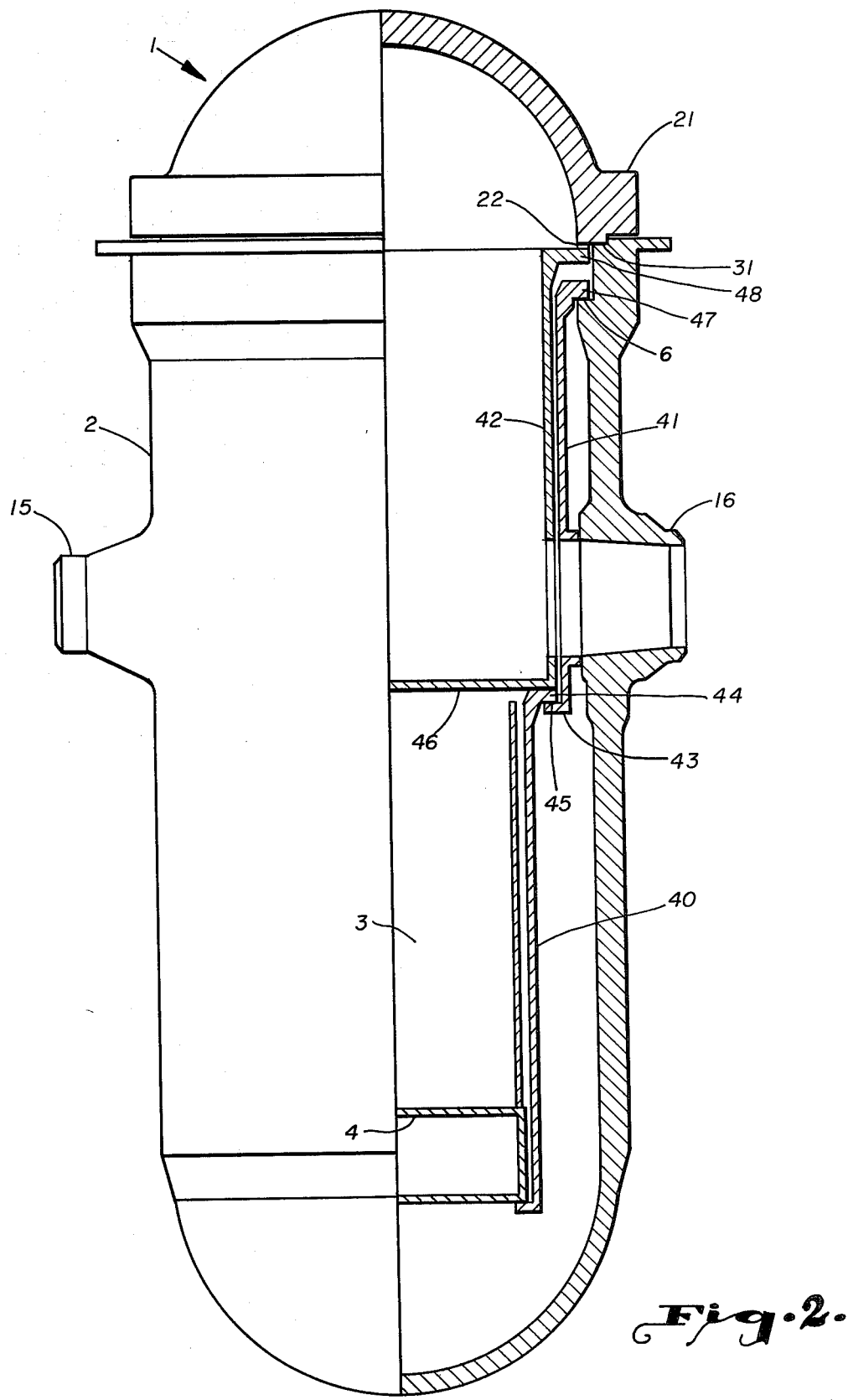

FIG. 2 discloses how the present invention makes a core support barrel of at least two parts practical. If the height of the barrel can be reduced, handling of the reactor parts is simplified.

In FIG. 2 reactor 1, vessel 2, fuel region 3, plate 4, ledge 6, inlet nozzle 15, outlet nozzle 16, closure 21, shim 22 and closure surface 31 are redisclosed. The remaining structure, regardless of its similarity or differences to FIG. 1 structure, is given independent designation.

The core support barrel 40 is quite short, compared to the core support barrel 5 of FIG. 1. This barrel is held in position by being coupled to intermediate core support barrel 41 and holddown barrel 42. More specifically, an inwardly projecting flange 43 is provided on the lower end of barrel 41. Outwardly projecting flange 44 is provided at the upper edge of barrel 40. This flange 44 is seated at 45 and clamped on that seat 45 by the lower end of barrel 42.

Barrel 42, with plate 46, becomes comparable to barrel 20 and plate 26 of FIG. 1 in that both can function as the upper guide support for the control rods of the nuclear core, and, at the same time, function as the holddown structure for the core support barrel 40. From one viewpoint, intermediate core support barrel 41 is simply an upward extension of barrel 40. As such, both barrels are hung from ledge 6 by flange 47 on the upper end of barrel 41.

From a second viewpoint, flange 48 and flange 47 and shim 22 are spaced between ledge 6 and closure surface 31 to provide the loading on barrel 40 which will prevent its displacement by hydraulic forces of the coolant. Specifically, barrel 42 and intermediate barrel 41 form the elastic spring link of the invention with which the holddown force on the core support barrel 40 is transmitted from the holddown force on closure 21.

As in FIG. 1, the vertical location of the coupling between barrel 40 and barrels 41 and 42 is not limited to the disclosure of the drawing. Other design factors may change this location. The important gain is that core support barrel 40 does not have to extend the distance up to ledge 6. As a greatly shortened structure, it is separately handled more readily than the lengthy core support barrel 5 of FIG. 1. And this gain in handling flexibility does not sacrifice strength of the elastic link with which holddown force is generated on the core support barrel.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. In a nuclear reactor vessel, a structure for applying a holddown force to the core support barrel, including,
   an internal ledge formed on the upper end of the vessel,
   a core support barrel positioned down and within the vessel,
   a flange formed on the upper end of the core support barrel and arranged to engage the internal ledge of the vessel to hang the barrel from the ledge,
   a closure for the reactor vessel and means for seating the closure on the upper end of the vessel with a predetermined force,
   and a holddown barrel arranged in the vessel to extend from the closure to a seat on the core support barrel, the seat being located a substantial distance below the internal ledge.

2. The holddown structure of claim 1, including,
   a shim ring positioned between the vessel closure and upper end of the holddown barrel and sized to load the core support barrel seating with a predetermined force when the closure is clamped to the vessel and on the shim ring.

3. In a nuclear reactor vessel, a connecting link between the upper closure of the vessel and the core support barrel, including,
   an internal ledge formed at the upper end of the vessel,
   a first cylindrical barrel having an upper flange engaging the ledge and a lower flange coupled to the core support barrel,
   and a second cylindrical barrel extended down into the first barrel and having an upper flange engaging the upper closure of the vessel and a lower end coupled to the lower flange of the first barrel and the core support barrel,
   whereby the two barrels are clamped between the vessel ledge and closure on their upper ends and coupled to the core support barrel at their lower ends to transmit the holddown force on the closure to the core support barrel.

4. The connecting link of claim 3, including,
   a shim ring sized and arranged between the upper flange of the second barrel and the closure to predetermine the holddown force on the closure transmitted through the link and to the core support barrel.

5. In a nuclear reactor vessel, a holddown structure between the upper closure of the vessel and a core support barrel, including,
   an upper closure of the vessel providing a flat downwardly facing surface interior of the vessel when clamped in place,
   a ledge formed internally at the upper end of the vessel and providing a flat upwardly facing surface below the closure face,
   a supporting cylinder placed within the vessel and having an upper flange extending outwardly to rest on the vessel ledge, the cylinder wall extending downwardly to form a flange extending inwardly of the vessel,
   a core support barrel placed within the vessel and having an upper flange extending outwardly to rest on the flange of the supporting cylinder which extends inwardly of the vessel,
   and a holddown cylindrical barrel placed within the supporting cylinder and having an upper flange extending outwardly and above the upper flange of the supporting cylinder to beneath the flat downwardly facing surface of the closure, the cylinder wall of the barrel extending downwardly to seat on the lower flange of the core support barrel and apply the holddown force clamping the closure to the vessel to the lower flange of the core support barrel.

6. The holddown structure of claim 5, including,
   a shim rim sized and arranged between the flat downwardly facing surface of the closure and the upper flange of the holddown barrel to load the core support barrel with a predetermined holddown force when the closure is clamped to the vessel and on the shim ring.

* * * * *